United States Patent [19]

Orth

[11] Patent Number: 4,542,705
[45] Date of Patent: Sep. 24, 1985

[54] APPARATUS FOR RENEWING GREEN AREAS AND LAWNS

[75] Inventor: Günther Orth, Birken, Fed. Rep. of Germany

[73] Assignee: Wolf-Gerate GmbH, Fed. Rep. of Germany

[21] Appl. No.: 545,133

[22] Filed: Oct. 25, 1983

[30] Foreign Application Priority Data

Oct. 25, 1982 [DE] Fed. Rep. of Germany ....... 3239469
Oct. 6, 1983 [DE] Fed. Rep. of Germany ....... 3336455

[51] Int. Cl.⁴ .............................................. A01C 5/06
[52] U.S. Cl. ......................................... 111/85; 111/88
[58] Field of Search .................... 172/554, 19, 22, 21, 172/540, 172, 555, 149, 120, 20, 548–556, 180, 142, 177, 547, 556, 572, 551; 111/1, 85, 86, 87

[56] References Cited

U.S. PATENT DOCUMENTS

| 647,069 | 4/1900 | Bergom | 172/177 |
|---|---|---|---|
| 676,476 | 6/1901 | Secor | 111/85 X |
| 1,031,167 | 7/1912 | Bushnell | 111/85 |
| 1,139,968 | 5/1915 | Hamilton | 301/44 R |
| 1,282,119 | 10/1918 | Paterson et al. | 172/548 X |
| 1,858,749 | 5/1932 | Paterson et al. | 172/547 X |
| 1,875,159 | 8/1932 | Rowe | 172/177 |
| 3,087,444 | 4/1963 | Ferguson et al. | 111/85 |
| 3,247,812 | 4/1966 | Luciano et al. | 172/177 |
| 3,847,437 | 11/1974 | Williams | 172/551 X |
| 4,217,835 | 8/1980 | Fox | 111/85 |

FOREIGN PATENT DOCUMENTS

| 1918020 | 6/1965 | Fed. Rep. of Germany . |
|---|---|---|
| 906522 | 7/1965 | Fed. Rep. of Germany . |
| 1920020 | 8/1965 | Fed. Rep. of Germany . |
| 1272612 | 7/1968 | Fed. Rep. of Germany . |
| 1978855 | 7/1969 | Fed. Rep. of Germany . |
| 2232108 | 1/1974 | Fed. Rep. of Germany . |
| 2608074 | 1/1978 | Fed. Rep. of Germany . |
| 8021339 | 8/1980 | Fed. Rep. of Germany . |
| 1380400 | 1/1975 | United Kingdom | 172/555 |

Primary Examiner—Robert A. Hafer
Assistant Examiner—Danton DeMille
Attorney, Agent, or Firm—Ostrolenk, Faber, Gerb & Soffen

[57] ABSTRACT

An apparatus for producing parallel-walled grooves in green areas and lawns. Slits which form the walls of the groove are produced by means of tools which are arranged at the periphery of a drum, or alternatively, on a rolling wheel body. Each tool comprises a pair of knives which produce the parallel slits or cuts. A cutting edge is provided, which extends between the knives and produces a transverse cut in the region of the groove. The cutting edge can simultaneously serve to eject the earth. Alternatively a clearance tyne, which also serves to lift the earth, can be arranged behind the knives in the direction of running. In accordance with a further embodiment, spring loaded runners are provided which are fixed to the frame of the apparatus and are located between knife carrying discs, i.e. between the grooves that are formed, or in the grooves that are formed, i.e. between the two knife carrying discs of a pair of knife carrying discs. These runners carry capping shares at their rear ends, with the capping shares being respectively aligned with the knife carrying discs of each pair and working in thegroove that is formed. The frame on which the knife carrying discs are journalled is vertically spring loaded relative to the machine frame and the lateral spacing of the knife carrying discs can be adjusted as required. The knife blades have a triangular shape with a steep flank and a shallow flank. The shallow flank forms the leading edge when the apparatus is used on soft ground, whereas the steep flank forms the leading edge when the apparatus is used on hard ground. Seed guide tubes direct the seed into the grooves that are formed and the outlet ends of the seed tubes lie in the direction of travel behind the capping shares. The apparatus can be used to renew green areas and lawns, it is however also possible in this manner to provide harvested stubble fields with between-season fruits without the need to break up the whole field.

8 Claims, 9 Drawing Figures

APPARATUS FOR RENEWING GREEN AREAS AND LAWNS

BACKGROUND AND SUMMARY OF THE INVENTION

The invention relates to an apparatus for producing parallel-walled grooves in green areas and lawns.

An apparatus of this kind is described in German patent document DE-AS No. 12 72 612. In this arrangement grooves which cross one another at spacings of approximately 15 to 60 cm are milled into the surface of the lawn by a rapidly rotating milling disc, which is of star-like construction and carries cutting tools at the outer ends of the arms of the star. These milling tools lift out the earth over the entire width of the groove and this is intended to result in a parallel-flanked cut. In practice however, parallel-flanked grooves are not formed when using a milling disc of this kind. Instead, grooves with broken-out walls are formed, and earth from the walls can refill partially the grooves.

In contrast, the invention is based on the object of providing grooves of a predetermined and changing depth relative to the ground. With the invention the walls of the grooves generated are uncompressed and cut out smoothly, so that adaptation to the various types of ground, different moisture conditions, changing scar densities and other factors is ensured.

With this apparatus it is possible to sow the seed so that ideal growth conditions are obtained. Accordingly the seed is deposited at predetermined periodically changing depths in the grooves in order to free the seed from pernicious effects of old grass or vegetation.

Furthermore, there is the decisive advantage of being able to automatically deposit the seed at various depths which reduces the sowing risks to a quite considerable degree when unfavorable weather conditions prevail. This is so because the seed grains which lie flat start to grow relatively quickly, whereas the seed kernels which lie at greater depths germinate in a stepped time sequence, with the grains at the troughs of the grooves starting to grow last. Moreover, the largest moisture reserves are present in the deep layers and this is also helpful in controlling sowing plans.

One embodiment in which runners are mounted between cutting knives resultss in a resilient sliding support between the knives which cut the slits on the ground to improve the slit formation.

These runners are preferably constructed as carriers for capping shares, which follow the knife blade pairs and cut free the groove which is created, prior to planting the seed automatically behind the capping or clearance shares.

The design according to the present invention meets all the requirements which arise in practice and which can be adapted by simple reversal or replacement of tools to meet the most diverse requirements for ideal seeding, without ignoring important considerations such as the working width, the quantity of seed and the seed spacing.

BRIEF DESCRIPTION OF THE DRAWINGS

Embodiments of the invention will now be described with reference to the drawings which show.

DETAILED DESCRIPTION

The tools for the apparatus of the invention can be constructed in accordance with the embodiment of FIGS. 1-4. As seen in these figures, each tool consists of two triangular knives 18 which are arranged parallel to one another on either side of a spacer 20. The knives are clamped to the spacer 20 at one corner by means of a threaded bolt 22. The spacer 20 is connected to a spigot 24 which passes through a hole in a knife beam 26 and is secured by a nut 28. The spacer is, as can be seen from FIG. 1, of a blade-like, two-sided conical construction with the rear side of the spacer extendingover approximately one half of the length of the trailing edge 30 of the knife.

Figure 1:
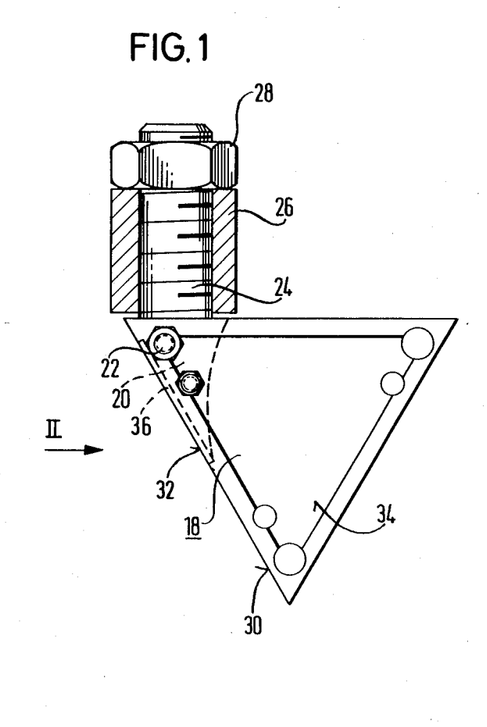
FIG. 1 a side view of a double knife for the apparatus of the invention.
Figure 2:
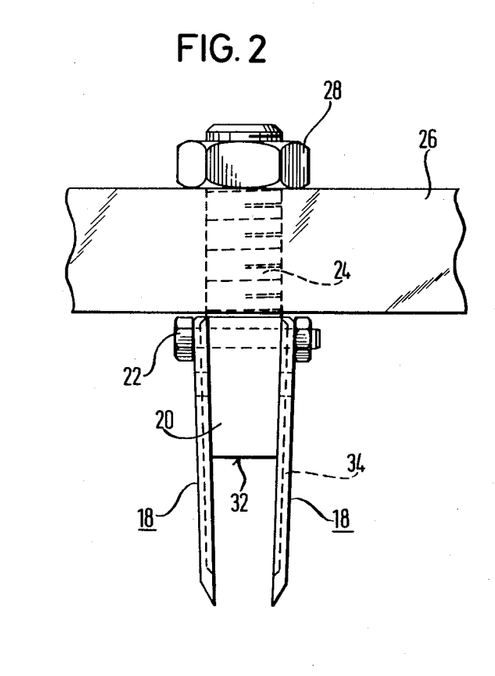
FIG. 2 a view of the tool in accordance with FIG. 1 as viewed in the direction of the arrow II.

By means of this shovel-like end piece 32 it is ensured that earth cut out between the two knives 18 is transversely separated and lifted out of the groove that is formed thereby. The knife beam 26 sits at the periphery of a roller or drum, not shown in the drawing, which has a diameter of approximately 60 cm. FIGS. 1 and 2 reproduce the tools with a scale of approximately 1:1. The triangular knives are preferably shaped in the same way as the triangular knives used for scythe-like lawnmowers. These knives have a triangular concave recess 34 at the inner side, which reinforces the grip on the wedge-like plug of earth as the tool is lifted out of the ground. In accordance with a preferred embodiment, the shovel-like end piece 32 is formed by a cutting blade 36 which is replaceably mounted on the spacer 20.

The number of grooves and their mutual spacing can be specified by the number and spacing of the knives on the knife beam. The spacing of the individual wave tips, i.e. the periodicity of the recesses, can be selected by providing an appropriate number of knife beams at the periphery of the roller. It is also possible, by providing an appropriate arrangement of the tools, to displace the waves of neighbouring grooves relative to one another.

Figure 3:
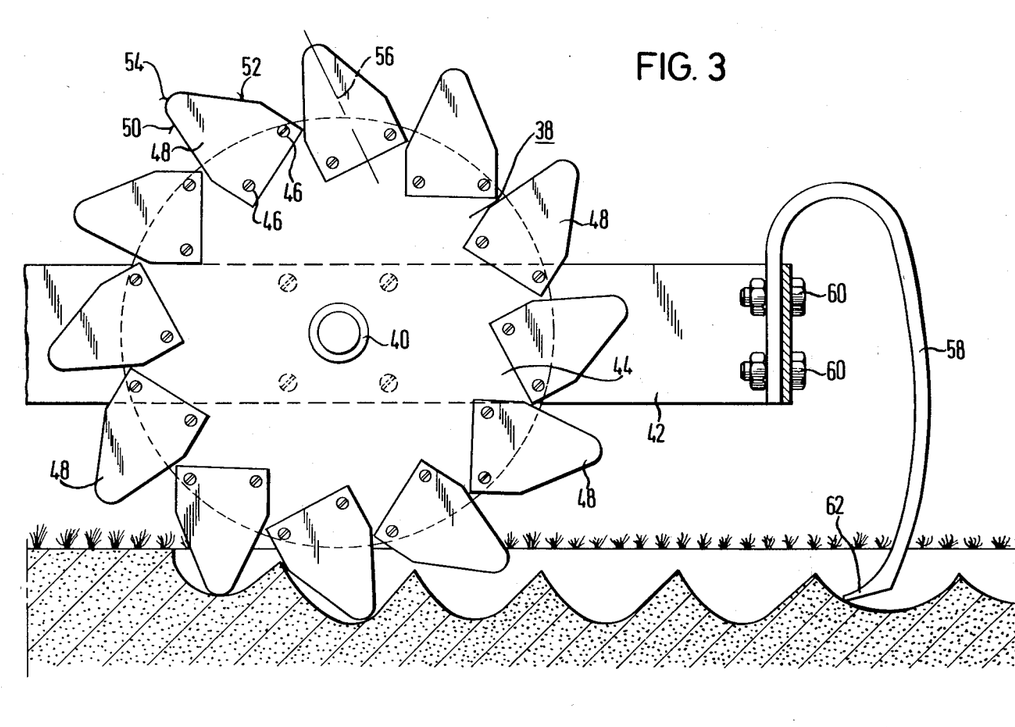
FIG. 3 a side view of a rotating machine for manufacturing the grooves using tools similar to those shown in FIGS. 1 and 2.
Figure 4:
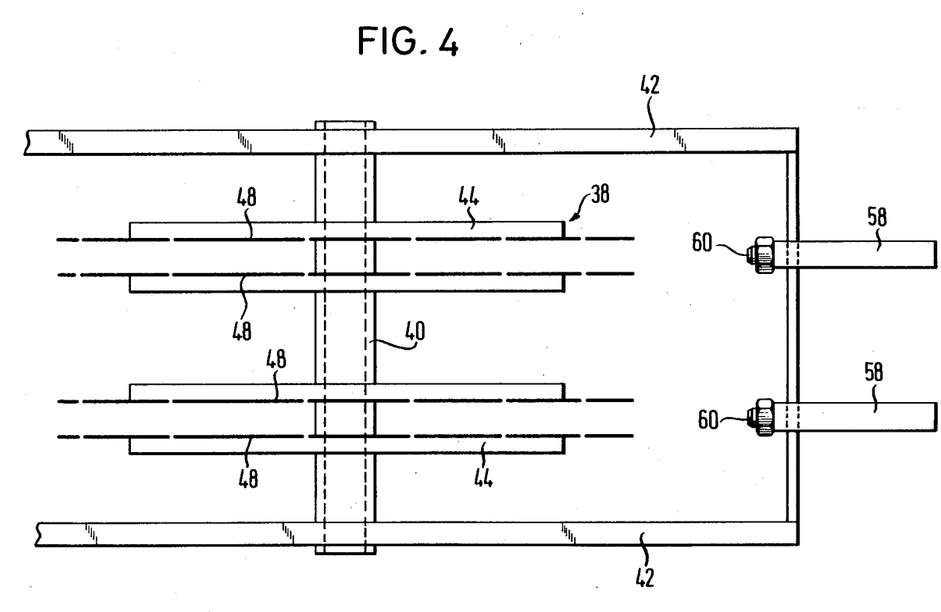
FIG. 4 a plan view of the apparatus of FIG. 3.

A further embodiment of a machine for producing toothed grooves can be seen from FIGS. 3 and 4. The machine illustrated here has a drum 38 which is carried by a shaft 40 which is in turn supported in bearing of two longitudinal beams 42. The longitudinal beams 42 are connected with one another in front of and behind the drum by transverse struts, which are not illustrated, and are provided with a towing hitch by means of which they can be hitched to a tractor or other towing machine.

The drum has a plurality of knife carrying discs 44 which are carried by the shaft 40 and which are preferably displaceable on this shaft and capable of being fixed in different axial positions. Triangular knives 48 are mounted to the periphery of the knife carrying discs by means of two screws 46 in the manner which can be seen from FIG. 3. These triangular knives are shaped in the form of an isosceles triangle and have a leading cutting edge 50 and a trailing cutting edge 52. A rounded tip part 54 extends between the leading and trailing cutting edges. As can be seen from FIG. 3, the knives are secured with screws so that their axis of symmetry 56 is inclined at an angle relative to the radius of the drum 38, so that the knives penetrate substantially vertically into the earth when the roller drawn by the towing machine rolls off to the left in accordance with FIG. 3.

Spacers with corresponding ejection shovels can again be arranged between the knives 48. It has however been shown that in this embodiment one can dispense with the individual shovels and remove the earth, to the extent that it is not lifted out by the knives, by a clearance tyne 58, which is secured behind the machine by means of screws 60 and which, in each case, is arranged behind a pair of knife carrying discs, between these discs, and which lifts the earth between the two lateral slits. Each tyne is provided with a forwardly directed tip 62, which points obliquely downwardly and can follow the wave form of the base of the groove or trench.

Figures 5, 6:
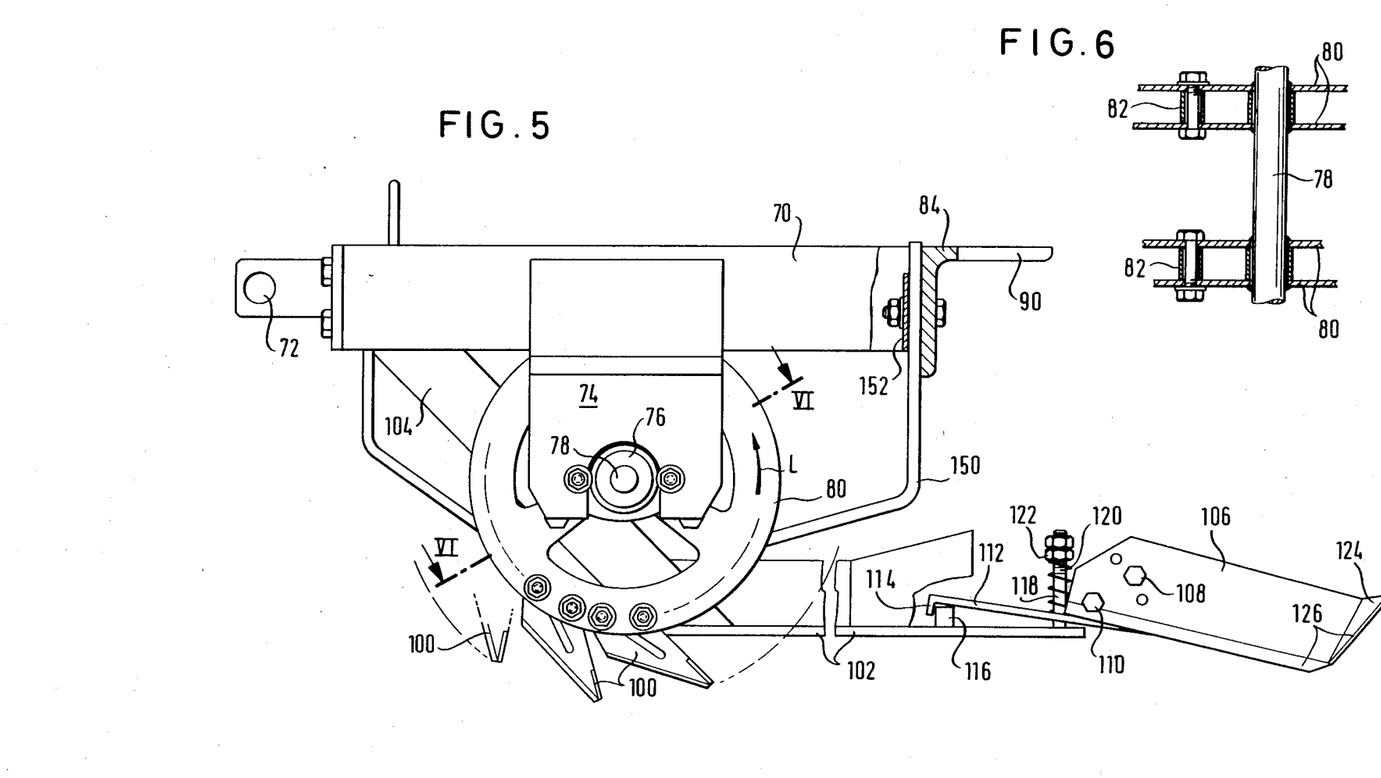
FIG. 5 a side view of another embodiment of an apparatus constructed in accordance with the invention for producing parallel-walled grooves in the ground.
FIG. 6 a section on the line VI—VI of FIG. 5.

A clearance tyne of this kind is arranged behind each pair of slit-forming knife carrying discs. In the embodiment of FIG. 5 a tool carrier 70 is provided, which corresponds to the frame of FIG. 4. This frame 70 is pivotally connected about a horizontal axis via a hinge 72 with the machine frame (not shown). The machine frame carries, alongside one another, a plurality of tool carrying frames 70 of this kind, the number of which depends on the width of the machine. The axes of the hinges 72 of the different tool carrying frames 70 are aligned. The frames 70 can be displaced relative to one another in their hinges, in order to change the groove spacing and different numbers of tool carrier frames 70 can be mounted, depending on the groove spacing and the width of the machine. The non-illustrated machine frame can in turn be vertically adjustably connected to the towing vehicle, so that the position of the tool carrying frame 70 can be changed. A shaft 78 is journalled via ball bearings 76 between two bearing supports 74 which extend downwardly from the side members of the frame 70. The knife carrying discs 80, of which respective pairs are connected together by spacers 82 which determine the groove width, are rotationally mounted on the shaft 78. The spacing of the pairs of knife carrying discs on the shaft 78 determines the groove spacing.

Figure 7:
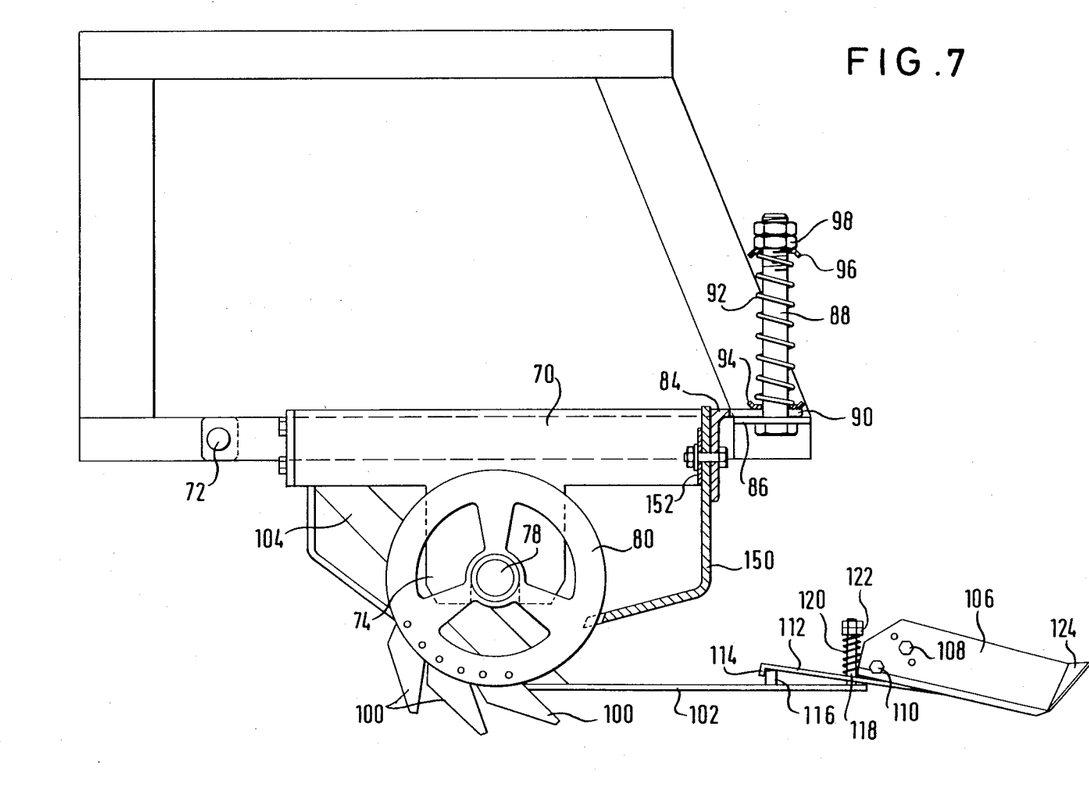
FIG. 7 a detail of the apparatus illustrated in FIG. 5.

As can be seen from FIG. 7, the rearwardly directed angular member 84 of the tool carrying frame 70 lies on a beam 86 of the main machine frame. An upwardly directed bolt 88, which projects through a slot 90 or bore of the angular piece 84 is secured to this beam and carries a coil spring 92 which is braced at both ends against spring plates 94, 96. The lower spring plate 94 lies on the angular member 84 and the upper spring plate 96 is braced against a nut 98, which is screwed onto the threaded bolt 88. In this manner the tool carrier frame 70 is elastically braced relative to the main machine frame, i.e. each individual frame 70 can pivot upwardly about the hinge 72 on encountering an increased resistance, whereby the spring 92 is compressed. Each individual tool carrier frame 70, together with its two pairs of knife carrying discs, can thus move out of the way of obstacles, or if short ground undulations exist.

Figure 8:
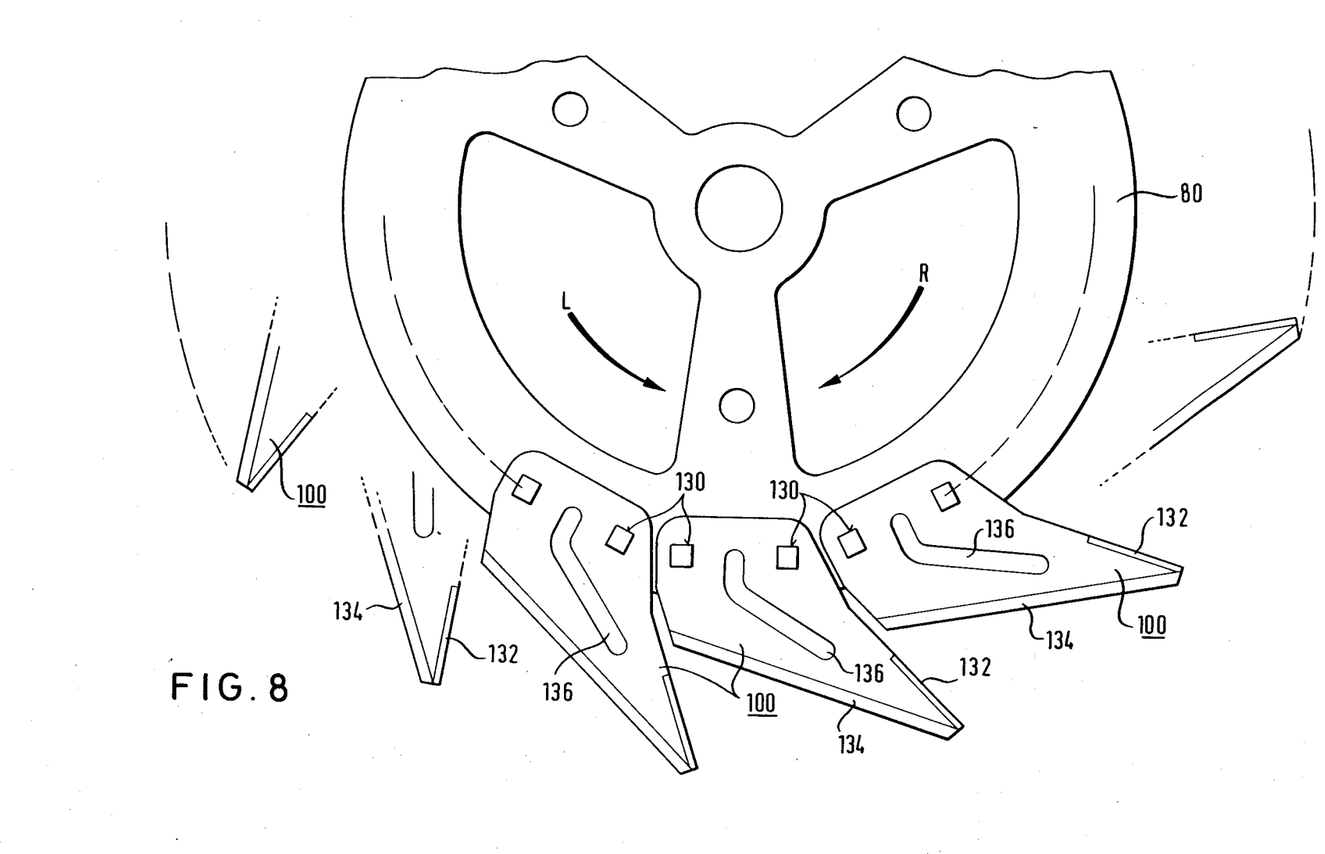
FIG. 8 a partial view of a knife disc in a larger scale.

Knife blades 100, which are described in detail in connection with FIG. 8, are mounted at the periphery of the knife discs 80.

Two runners 102 which are resiliently braced on the ground between the knife carrying discs 80 of each pair, are suspended from the tool carrier frame 70. The suspension of these runners 102 takes place via beam elements 104. These runners each carry a capping share 106 at their rear ends. These capping shares 106 are attached by means of two bolts, 108 and 110 to the rear angled end of the intermediate piece 112. The intermediate piece has a front follower claw 114, which rests on a bearing block 108 welded onto the runner 102. A bolt 118, which is fixedly connected with the runner 102, projects upwardly from the runner through a hole of the intermediate piece 112 and carries a compression coil spring 120 which is braced at one end against the intermediate piece 112 and at the other end against a nut 122 threaded onto the bolt. In this way the capping shares 106 are additionally spring loaded once again in the vertical direction.

As seen in FIG. 5, the bolt 108 passes through the central one of three holes lying on the same radius from the axis of the bolt 110 which provides a middle position for the capping share 106. If the bolt 108 is passed through the lower hole, then the angle of inclination of the capping share is reduced. If it is passed through the upper hole, then a greater angle of inclination results. The rear end of the capping share has an angled piece 124 which extends at an angle of 70° relative to the share 106 and this angled piece 124 is provided with a cutting edge 126 in the same way as the share. The cutting edge 126 of the angled piee 124 is tapered as can be seen from FIG. 5. The capping shares are arranged so that they are aligned with the intermediate space between the knife carrying discs for the knife pairs. They serve to clean up the grooves that are manufactured and, if desired, to level them in order to keep them free for the introduction of the seed. In order to prevent clogging, and in order to provide as large a free space as possible between the capping shares, the capping shares are expediently staggered by varying the lengths of adjacent runners 102.

Seed tubes 128 (FIG. 9), which allows the seed to pass from a container (not shown) into the grooves that are produced are arranged behind the capping shares 106. Behind these seed tubes there are arranged either sweeping-in plates or spring tynes which serve to cover the seed.

As can be seen from FIG. 8 in particular, each knife blade 100 is shaped essentially in the form of an acute triangle. Each knife is secured to the periphery of the knife carrying disc 80 via two securing holes 130 and the knife blade has a steep knife flank 132 and a shallow knife flank 134. The flank 134 subtends a small angle relative to the tangent to the knife carrying disc and the flank 132 subtends a larger angle. The included angle between the cutting edges measures approximately 75° to 80°.

The knife blade is reinforced by a rib 136. A portion of the trailing knife flank can be replaced by a shovel-like clearance edge which is bent inwardly at a right angle. When the knife carrying discs rotate in the direction of the arrow R of FIG. 8, then it can be the cutting edge 132 which has an inwardly directed clearing edge. In the illustration of FIG. 5, where the tractor acts at the left-hand side, the apparatus rolls from the right to the left, i.e. the knife carrying discs rotate in the direction of the arrow L. In this way the steep flanks 132 and the point of the knife blades come into engagement with the ground. This direction of rolling is particularly suitable for hard ground because in this way a deeper cut can be achieved for the same load. The knife carrying discs can, however, also be mounted so that they roll in the direction of the arrow R. In this case, the shallow flanks 134 of the knife carrying blades penetrate into the earth and this direction of rotation is expedient when softer ground is to be prepared.

Figure 9:
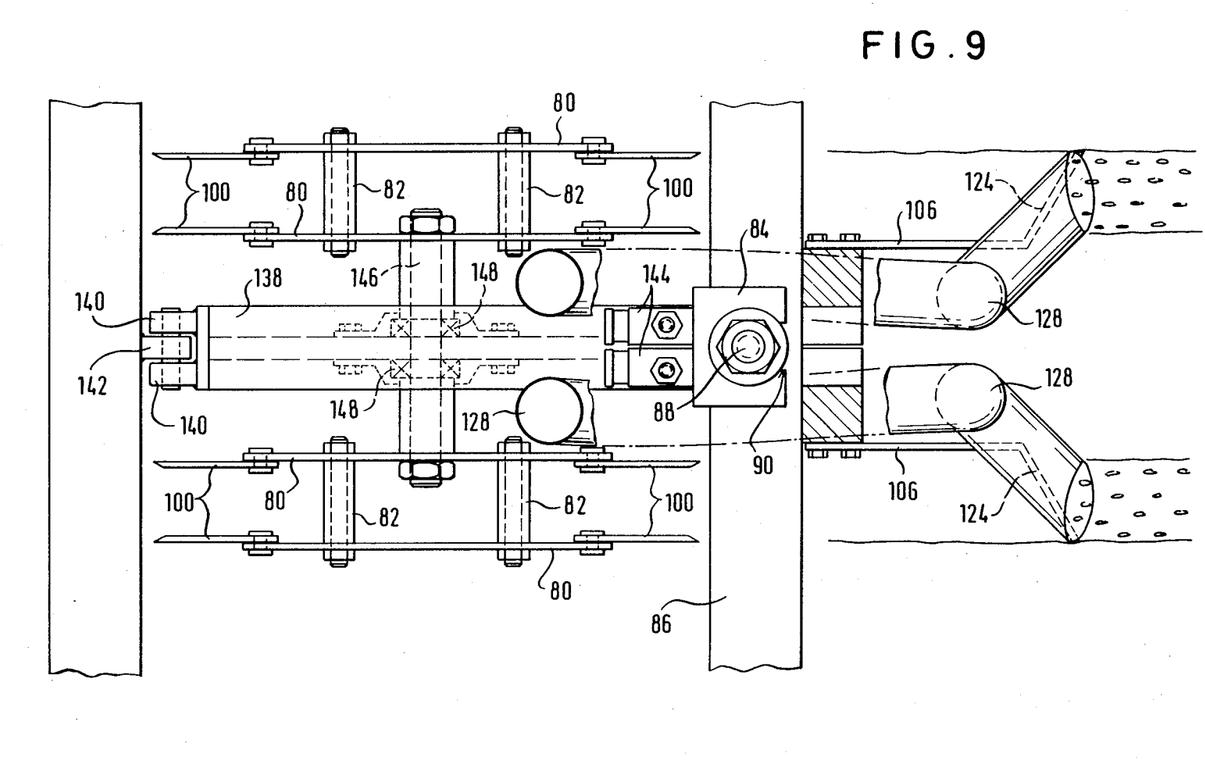
FIG. 9 a part view of a modified embodiment of an apparatus in accordance with the invention.

FIG. 9 shows a modified embodiment. In this embodiment the tool carrier frame 70 of FIGS. 5 and 7 is replaced by a carrier beam 138 which is pivotally connected via eyes 140 to a bearing 142 of the machine frame. This carrier beam 138 has in turn an angled piece 84 with a slot 90 which surrounds a bolt 88. Bolt 88 carries a coil spring as in the embodiment of FIG. 3, whereby the beam 138 is resiliently journalled. The carrier beam 138 serves as a mounting for two longitudinally displaceable runners 144, which each carry a capping share 106 at their rear ends, in each case via a bearing, with the angled ends 124 of the capping shares being aligned in each case with the intermediate space between two knife carrying discs of a pair of knife carrying discs. These knife carrying discs 80, the spacing of which is in turn fixed by distance pieces, are, in this case, carried by a shaft 146, which is journalled in a ball bearing 148 that is inserted in the carrier beam 138. The lateral spacing of the pairs of knife carrying discs can be adjusted by using shafts 146 of different lengths, or distance tubes of different lengths which are drawn onto the shaft 146.

The capping shares 106, the ground depth of which is adjustable, perform as clearance tools for the knife blades and have different tasks to fulfill, depending on the state of the surface to be worked:

1. For densely scarred green areas, the capping share has the task of either levelling the jagged seed groove that is left, or of cutting away the peaks of the toothed groove, in order to prevent depth variations in the toothed groove which are too pronounced.
2. For direct sowing on unprepared fields, the pairs of knife blades first bound the seed groove and the following capping share cleans it out to the desired depth.

When sowing cereals, the knife blades likewise form a lateral boundary for the grooves, whereas the capping shares principally have the task of providing a correspondingly broad sole for the uniformly deep deposition of the seed.

The seed itself is supplied via the seed box of a customary sowing machine to the individual seed tubes 128, which are depicted in FIG. 9. These seed tubes, either individually deposit the seed behind the capping shares, or they are arranged as a double tube in alignment behind the runners and only diverge in delta-form from one another shortly beyond the capping shares, in order to introduce the seed into the seed grooves which extend on both sides of each runner.

A clearance iron 150 can, as can be seen from FIG. 5, be provided between each two knife carrying blades, with the clearance iron being vertically adjustably mounted on the frame 70 by means of a clamping blade 152. This clearance iron 150 has the task of freeing adherent earth from the knife blades.

I claim:
1. Apparatus for producing parallel-walled seed grooves, said apparatus comprising:
   a frame;
   rotatable means rotatably supported on said frame, said rotatable means including a shaft and a plurality of disc pairs, said plurality of disc pairs being spacedly securable to said shaft, said shaft extending through said plurality of disc pairs, each said disc pair having first and second opposing and spaced outer peripheral perimeters;
   a plurality of first and second cutting means supported on each said disc pair, said first and second cutting means being arranged in pairs and positioned, respectively, on first and second discs of said disc pair and projecting outward of said perimeters;
   each said first cutting means being positioned on said first perimeter opposite the second cutting means positioned on said second perimeter;
   said pairs of cutting means being positioned such that the area, which is defined between said first and second cutting means and traversed by one pair of cutting means when said rotatable means is rotated, is overlapped by the same defined area of the pair of cutting means following in rotation, whereby continuous and spaced cuts will be formed;
   one respective elongated runner and one respective capping share associated with each said disc pair, said respective runner having a first and second end, said first end being attached to said frame and extending rearward thereof and along an area defined between said continuous cuts associated with said respective disc pair, said capping share being supported at said second end of said respective runner, said capping share including resiliency means for resiliently mounting capping share to bear against said area, and means for varying the resiliency of said resiliency means;
   adjacent ones of said runners having different lengths to allow said capping share to extend in a staggered arrangement behind said apparatus.

2. The apparatus of claim 1, further including respective spacer means associated with each said disc pair for establishing the distance between said first cutting means and its associated second cutting means, said spacer means being carried by said rotatable means.

3. The apparatus as in claim 1, wherein said cutting means comprises triangularly shaped knives which include two sides of equal length, said knives having an axis of symmetry extending between said two sides and a vertex defined by the point at which said two sides are joined, said axis of symmetry being inclined to a line extending from said vertex of said knives to said shaft of said rotatable means.

4. The apparatus as in claim 1, wherein said shaft is journalled in said frame and is resiliently braced relative to said frame in a vertical direction.

5. The apparatus according to claim 1, further comprising seed delivery tubes for delivering seeds into said groove behind said cutting tools after said matter has been cleared between said continuous cuts.

6. The apparatus as in claim 1, wherein each said capping share is vertically resiliently mounted behind said runner, said capping share including a follower claw and a compression spring to allow said capping share to be compressed. against an area defined between said continuous cuts.

7. The apparatus as in claim 1 wherein said cutting means comprises triangularly shaped knives having a main body and a first and second cutting edge formed on respective first and second adjacent sides which meet at a common point located outward of said perimeter of said disc pair, said first cutting edge extending at a first acute angle with respect to a line which extends from said common point to said shaft, said second cutting edge extending at a second acute angle with respect to said line which extends from said common point, said second acute angle being larger than said first acute angle, an acute angle being defined between said first and second sides.

8. The apparatus as in claim 1, further comprising a clearance means secured to said frame for clearing adherent matter from said cutting tools, said clearance means including a clamping plate for vertically and adjustably securing said clearance means to said frame.

* * * * *